United States Patent
Balakrishnan

(10) Patent No.: US 11,669,274 B2
(45) Date of Patent: Jun. 6, 2023

(54) WRITE BANK GROUP MASK DURING ARBITRATION

(71) Applicant: Advanced Micro Devices, Inc., Santa Clara, CA (US)

(72) Inventor: Kedarnath Balakrishnan, Bangalore (IN)

(73) Assignee: Advanced Micro Devices, Inc., Santa Clara, CA (US)

(*) Notice: Subject to any disclaimer, the term of this patent is extended or adjusted under 35 U.S.C. 154(b) by 49 days.

(21) Appl. No.: 17/218,676

(22) Filed: Mar. 31, 2021

(65) Prior Publication Data

US 2022/0317923 A1    Oct. 6, 2022

(51) Int. Cl.
    *G06F 3/06*    (2006.01)

(52) U.S. Cl.
    CPC .......... *G06F 3/0659* (2013.01); *G06F 3/0604* (2013.01); *G06F 3/0614* (2013.01); *G06F 3/0653* (2013.01); *G06F 3/0679* (2013.01)

(58) Field of Classification Search
    CPC .... G06F 3/0659; G06F 3/0604; G06F 3/0614; G06F 3/0653; G06F 3/0679; G06F 13/1626
    See application file for complete search history.

(56) References Cited

U.S. PATENT DOCUMENTS

| | | | |
|---|---|---|---|
| 5,948,081 A * | 9/1999 | Foster ................. | G06F 13/1642 710/39 |
| 9,293,188 B2 * | 3/2016 | Brandl ................. | G06F 13/1636 |
| 2004/0139286 A1 | 7/2004 | Lin et al. | |
| 2006/0215481 A1 | 9/2006 | Dally et al. | |
| 2008/0184002 A1 | 7/2008 | Lee | |
| 2009/0248972 A1 | 10/2009 | Ware et al. | |
| 2011/0099341 A1 | 4/2011 | Resnick | |
| 2012/0260032 A1 * | 10/2012 | Chiu ................... | G06F 13/1626 711/105 |
| 2013/0039135 A1 * | 2/2013 | Kang .................. | G11C 11/4093 365/189.16 |

(Continued)

OTHER PUBLICATIONS

International Search Report and Written Opinion for International Application No. PCT/US2022/020779, dated Jun. 16, 2022, 7 pages.

*Primary Examiner* — Charles Rones
*Assistant Examiner* — Tong B. Vo
(74) *Attorney, Agent, or Firm* — Polansky & Associates, P.L.L.C.; Paul J. Polansky; Nathan H. Calvert

(57) ABSTRACT

A memory controller includes an arbiter for selecting memory requests from a command queue for transmission to a dynamic random access memory (DRAM) memory. The arbiter includes a bank group tracking circuit that tracks bank group numbers of three or more prior write requests selected by the arbiter. The arbiter also includes a selection circuit that selects requests to be issued from the command queue, and prevents selection of write requests and associated activate commands to the tracked bank group numbers unless no other write request is eligible in the command queue. The bank group tracking circuit indicates that a prior write request and the associated activate commands are eligible to be issued after a number of clock cycles has passed corresponding to a minimum write-to-write timing period for a bank group of the prior write request.

20 Claims, 6 Drawing Sheets

(56) References Cited

U.S. PATENT DOCUMENTS

| | | | |
|---|---|---|---|
| 2015/0100723 A1* | 4/2015 | Brandl | G06F 13/1605 |
| | | | 711/106 |
| 2017/0206031 A1* | 7/2017 | Yin | G11C 5/148 |
| 2018/0349060 A1* | 12/2018 | Ochiai | G06F 13/1673 |
| 2020/0020384 A1* | 1/2020 | Zhao | G11C 11/40618 |
| 2020/0285580 A1* | 9/2020 | Subramanian | G06F 13/1668 |

* cited by examiner

WRITE BANK GROUP MASK DURING ARBITRATION

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus.

A memory controller is a digital circuit that manages the flows of data going to and from the DRAM over the memory bus. The memory controller receives memory access requests from the host system, stores them in a queue, and dispatches them to the DRAM in an order selected by an arbiter. As time goes on, JEDEC has specified DDR DRAMs with additional features and complexity, making it difficult for DRAM memory controllers to optimize memory access efficiency without causing excessive size and cost and requiring complete re-design of prior memory controllers.

Figure 1:
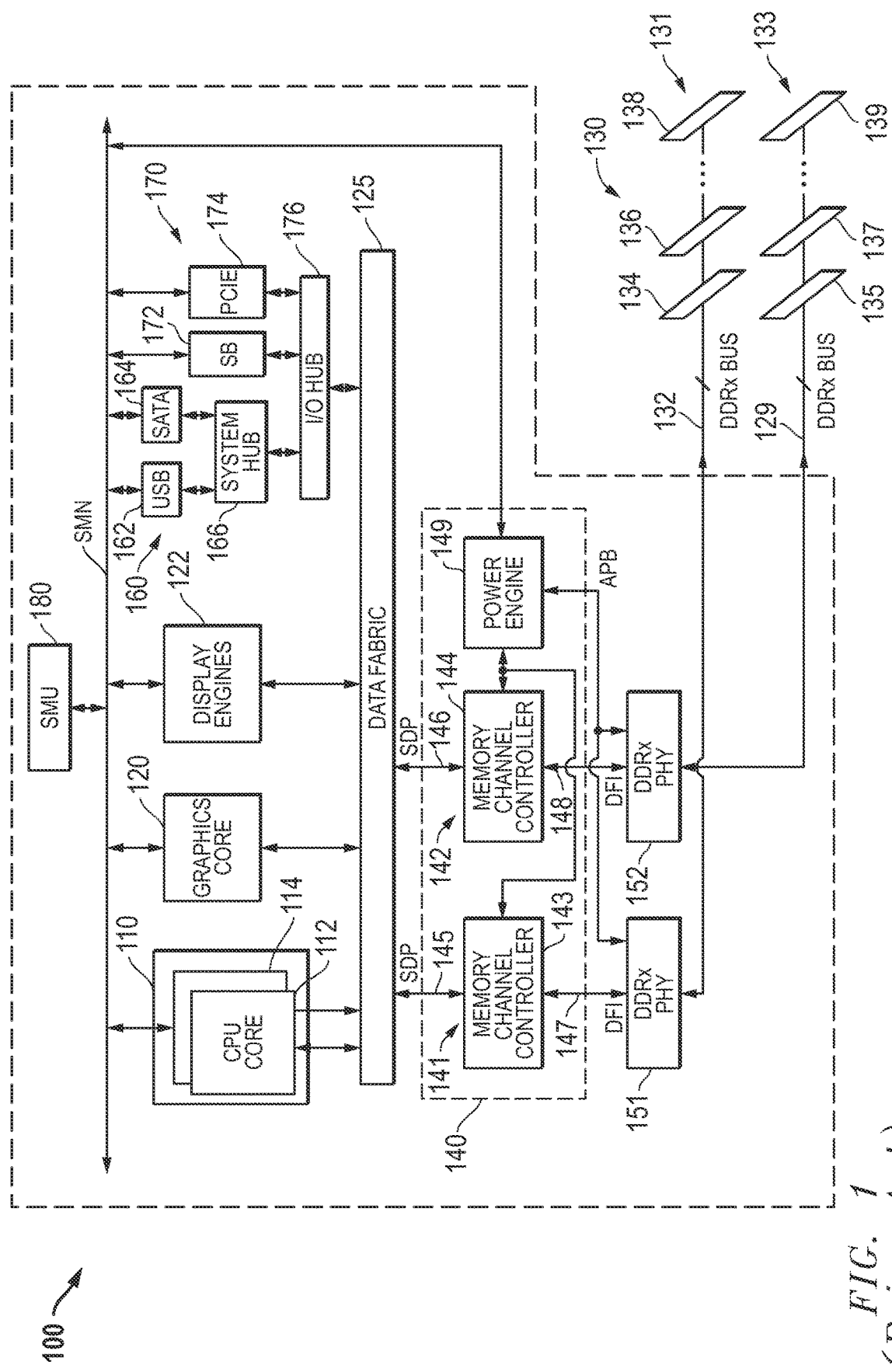
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a command queue and an arbiter. The command queue has an input for receiving memory access requests for a memory channel, and a number of entries for holding a predetermined number of memory access requests. The arbiter is for selecting memory requests from the command queue for transmission to a DRAM memory connected to a DRAM channel, and includes a bank group tracking circuit that tracks bank group numbers of three or more prior write requests selected by the arbiter, and a selection circuit. The selection circuit selects requests to be issued from the command queue, and prevents selection of write requests and associated activate commands to the tracked bank group numbers. The bank group tracking circuit indicates that a prior write request and associated activate command are eligible to be issued after a designated period has elapsed.

A method includes receiving a plurality of memory access requests at a memory controller and placing them in a command queue to await transmission to a DRAM memory including multiple bank groups. Write requests are selected with an arbiter from the command queue for transmission to the DRAM memory. Bank group numbers are tracked for three or more prior write requests selected by the arbiter. Selection of a subsequent write request and associated activate command to the tracked bank group numbers is prevented. A prior write request and associated activate commands are made eligible to be issued after a designated period has elapsed.

A data processing system includes a memory channel connected to a DRAM memory, and a memory controller connected to the memory channel. The memory controller includes a command queue and an arbiter. The command queue has an input for receiving memory access requests for a memory channel, and a number of entries for holding a predetermined number of memory access requests. The arbiter selects memory requests to be issued from the command queue for transmission to the DRAM memory, and includes a bank group tracking circuit that tracks bank group numbers of three or more prior write requests selected by the arbiter, and a selection circuit that prevents selection of write requests and associated activate commands to the tracked bank group numbers. The bank group tracking circuit indicates that a prior write request and associated activate command are eligible to be issued after a designated period has elapsed.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a data fabric 125, a memory management hub 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 through data fabric 125 for uniform translation into appropriate addresses in memory system 130.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
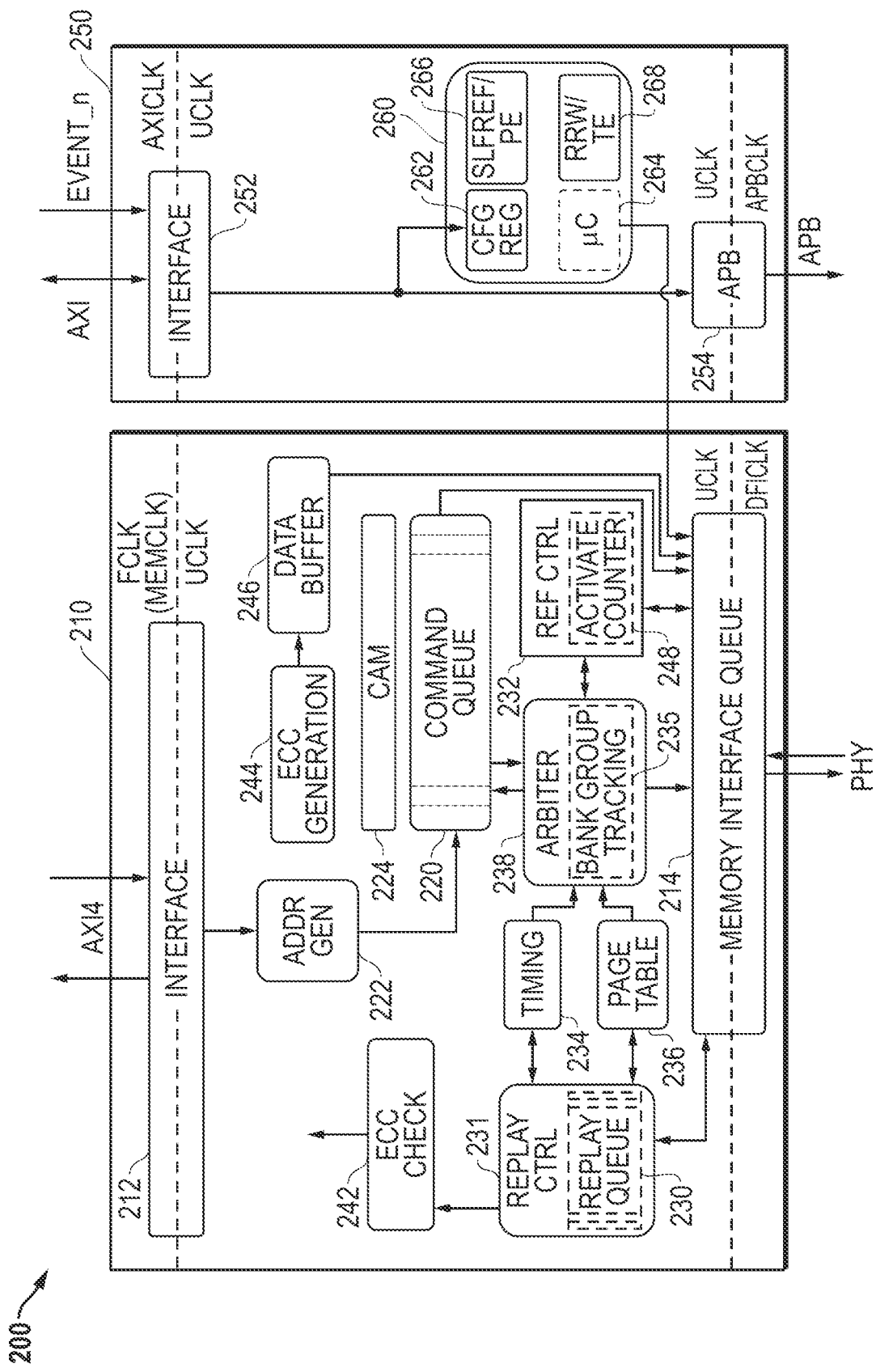
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, a refresh control logic block 232, a timing block 234, a page table 236, an arbiter 238, an error correction code (ECC) check circuit 242, an ECC generation block 244, a data buffer 246, and refresh control logic 232

Interface 212 has a first bidirectional connection to data fabric over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from the data fabric over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Error correction code (ECC) generation block 244 determines the ECC of write data to be sent to the memory. This ECC data is then added to the write data in data buffer 246. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments as further discussed below. In addition, refresh control logic 232 periodically calibrates ZQ to prevent mismatch in on-die termination resistance due to thermal changes in the system.

Arbiter 238 is bidirectionally connected to command queue 220 and is the heart of memory channel controller 210, performing intelligent scheduling of accesses to improve the usage of the memory bus. In this embodiment, arbiter 238 includes a bank group tracking circuit 235 for tracking the bank group numbers of a number of recently issued write commands, and "masking" those bank groups by preventing dispatch of commands to them for a designated period of time under certain conditions, as further described below. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an advanced peripheral bus (APB) interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (µC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. SLFREF/PE 266 is an engine that allows the manual generation of refreshes in addition to the automatic generation of refreshes by refresh control logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page. Arbiter 238, in some embodiments, determines eligibility for command selection based on at least on respective values of activate counter 248 for target memory regions of the respective commands.

Figure 3:
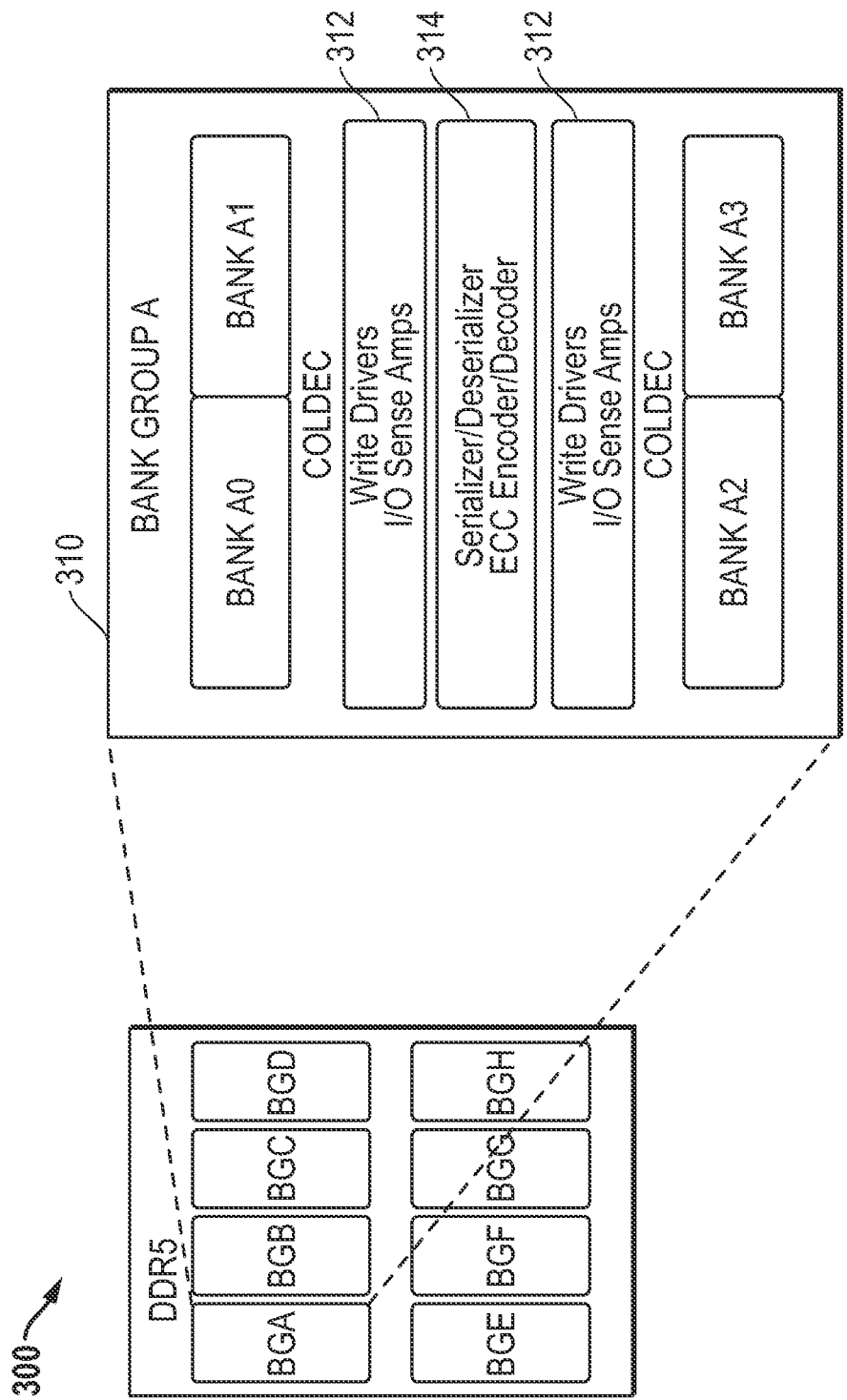
FIG. 3 illustrates in block diagram form a bank group structure of a memory according to the prior art.

FIG. 3 illustrates in block diagram form a bank group structure 300 of a DDR5 memory according to the prior art. Generally, the DDR5 standard doubles the maximum number of bank groups with respect to DDR4 memories while offering more total banks, allowing improved overall system efficiency by allowing more pages to be open at any given time. The DDR5 bank group scheme allows DDR5 DRAMs to have relatively small size by sharing common circuitry between memory arrays of four banks instead of two banks. However, the DDR5 standard also includes on-die ECC calculation, which causes the data write circuitry for a bank group to be occupied for a longer period with each write than prior standards like DDR4.

The depicted bank group structure 300 shows 8 bank groups in a DDR5 memory, the bank groups labeled "BGA" through "BGH". (The DDR5 standard allows for different bank groupings for the 32 banks of a DDR5 memory device.) A bank group block 310 shows the structure of bank group BGA. Bank group block includes four banks "A0", "A1", "A2", and "A3" and their shared input/output circuitry. The shared circuitry includes column decoders ("COLDEC"), write drivers and I/O sense amps 312, and a serializer/deserializer and ECC encoder/decoder block 314.

In operation, the ECC encoder/decoder causes a delay between write commands to any of the bank in the bank group, because the ECC must be calculated and stored when data is written. In DDR5, this ECC is stored in 8 additional bits of memory for every 128 bits of data stored to DRAM. For each write command, the ECC encoder computes the ECC for the write data, which is then stored in the additional bits of memory. The time required for the ECC encoder to function increases the "minimum write to write" time within a same bank group to a much larger time than required in prior standards that do not include on-die ECC. For example, while standards without such on-die ECC had same bank write to write times around 9, 10, or 11 clock cycles, the on-die ECC increases this time by 4-8×, for total same bank write to write delays of around 32-64 clock cycles, depending on particular implementations. Also, if the write data size is smaller than the code word used for ECC (typically 128 bits), the DRAM performs a "Read-Modify-Write" (RMW) operation because a new ECC code must be computed for the entire code word, not just the modified portion. Such use of RMW commands further increases the minimum write-to-write time. No RMW is needed when the number of bits written are equal in size to the number of bits in the ECC codeword.

Figure 4:
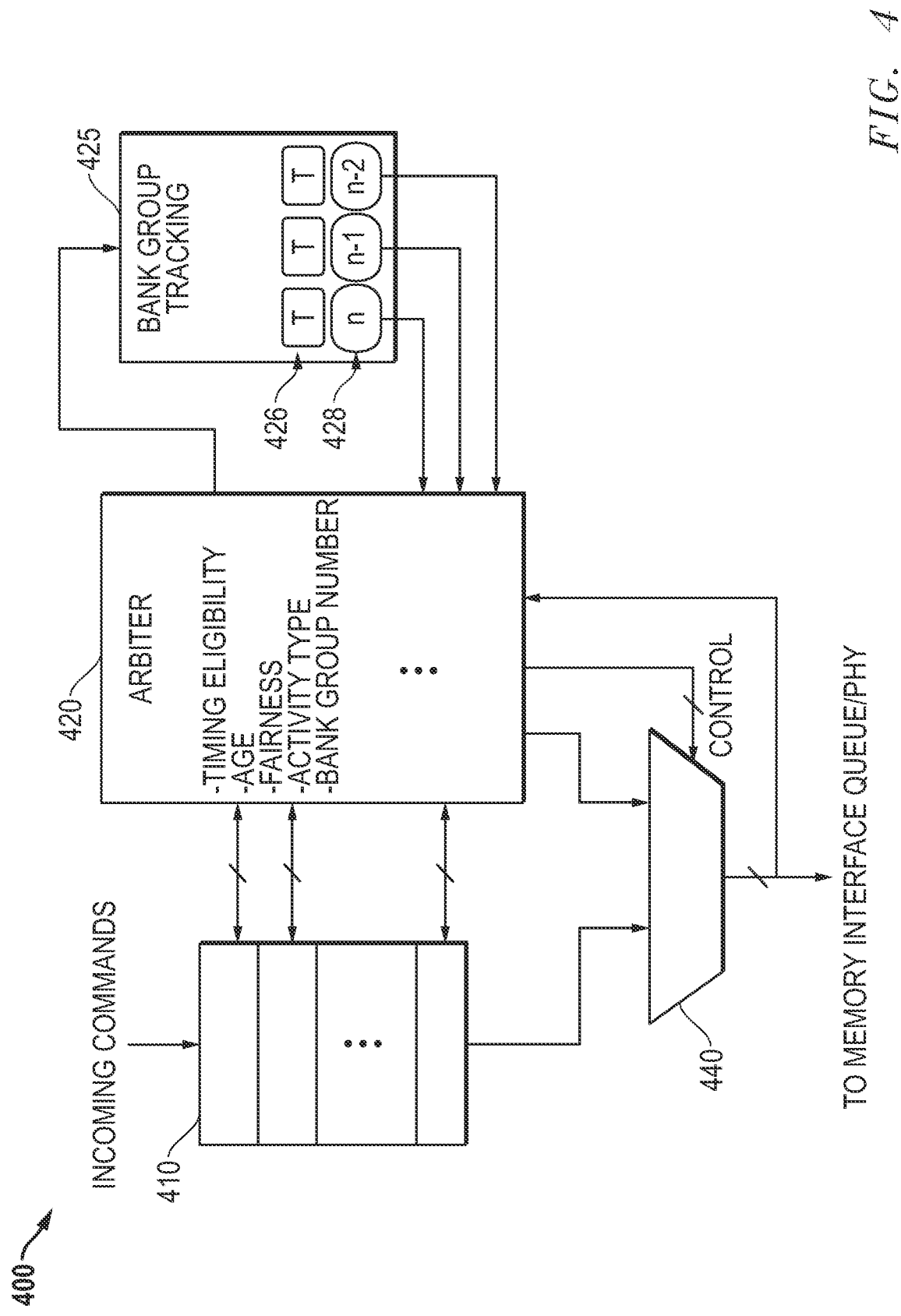
FIG. 4 illustrates in block diagram form a portion of the memory controller of FIG. 2 according to some embodiments.

FIG. 4 illustrates in block diagram form a portion 400 of the memory controller 200 of FIG. 2 according to some embodiments. The depicted portion 400 is suitable for use in a memory controller for DDR5, GDDR5, and other similar DRAM types with bank groups and on-die ECC calculations performed by circuitry shared by all banks in the bank group. Portion 400 includes a command queue 410, an arbiter 420 with an associated bank group tracking circuit 425, and a multiplexer 440. Command queue 410 stores memory access requests received from interface 212. The memory access requests could be read or write cycles to any bank in the memory and are generated by any one of the memory accessing agents in APU 100. In the example of FIG. 4, command queue 410 has a total of 16 entries for all banks and ranks, each entry storing an access address, data in the case of a write cycle, and a tag that indicates its relative age. Arbiter 420 is bidirectionally connected to each entry in command queue 410 for reading its attributes, has an additional input for receiving an access as it is dispatched, has an output for providing protocol commands such as ACT and PRE commands, and has a control output for selecting one of the sixteen entries to send to interface 212. Multiplexer 440 has sixteen inputs connected to respective entries of command queue 410, an additional input connected to the output of arbiter 420, a control input connected to the output of arbiter 420, and an output for providing a dispatched access to the memory PHY.

Bank group tracking circuit 425 has an input connected to an output of arbiter 420, and a number of outputs connected to respective inputs of arbiter 420. Bank group tracking circuit 425 includes a number of timers 426 each labeled "T", each connected to a respective bank group number entry 428, and bank group tracking logic for implementing the tracking functions. In operation, bank group tracking circuit 425 receives indicators from arbiter 420 when write commands are selected and dispatched to the memory interface queue. The information received in the indicator includes a bank number or bank group number for the write command selected. If a bank number is provided, the bank group tracking logic will provide the bank group number for the bank group containing the identified bank number. In response to each indicator, the bank group number for the selected command is added to one of the bank group number entries 428, and the respective timer 426 is activated to track the time since the write command was dispatched by counting a number of clock cycles for which the respective bank group number has been tracked. Each entry 428 is connected to arbiter 420 for the arbiter to check which bank group numbers are being tracked when selecting new write commands for dispatch to memory. Each entry is tracked until a number of clock cycles counted by the respective timer 426 has passed corresponding to a minimum write-to-write timing period for the bank group, after which the bank group number is removed from its respective entry 428 and is no longer tracked. The number of tracked bank group numbers may vary depending on the length of the minimum write-to-write timing period for a bank group, which is typically selected based on the speed of a DRAM chip in calculating on-die ECC codes and writing them to DRAM along with the relevant write data. For example, if the minimum write-to-write time period is above 40 clock cycles, four write commands could possibly be sent to DRAM during such a time, so the bank group number tracking circuit has entries for tracking four commands. For longer minimum write-to-write time periods, more bank group number entries are used. Preferably, the bank group tracking circuit is provided with enough entries to track the commands for the maximum allowed write-to-write time period.

Command queue 410 stores accesses received from interface 212 and assigns a tag to indicate its relative age. Arbiter 420 determines which pending access in command queue 410 to schedule and dispatch to the memory interface queue 214 based on a set of policies such a timing eligibility, age, fairness, and activity type. Arbiter 420 also considers the tracked bank group numbers from bank group tracking circuit 425 when selecting commands from command queue 410. In particular, arbiter 420 prevents selection of write requests and associated activate commands to the tracked bank group numbers unless no other write request to another bank group is eligible in command queue 410.

Arbiter 420 includes a page table, not shown in FIG. 4, to indicate open pages in each bank and rank of the memory system. In general, arbiter 420 can increase the efficiency of the memory system bus by scheduling multiple accesses to the same row together and delaying an older access to a different row in the same bank. Thus arbiter 420 increases efficiency by selectively deferring accesses to a different row than a currently activated row. Arbiter 420 also uses an entry's age tag to limit the latency of an access. Thus arbiter 420 will interrupt a series of accesses to an open page in memory when an access to another page has been pending for a certain amount of time. Arbiter 420 also schedules accesses to other memory banks in between ACT and PRE commands to a given memory bank to hide the overhead.

As discussed above, based on the tracked bank group numbers in entries 428 of bank group tracking circuit 425, arbiter 420 prevents selection of write requests and associated activate commands to the tracked bank group numbers unless no other write request to another bank group is eligible in the command queue. If a request is passed over (not selected) because its bank group number is tracked, it becomes eligible after the tracking period expires. Bank group tracking circuit 425 indicates that a prior write request is eligible to be issued after a designated period has elapsed. In this embodiment, the designated period is based on the number of clock cycles corresponding to a minimum write-to-write timing period for the bank group of the prior write request. This indication includes at least removing the bank group number from its corresponding entry 428. In some embodiments, bank group tracking circuit 425 also interfaces with command queue 410 to tag or label each write command in command queue 410 with an eligibility tag, or a mask tag (to indicate ineligibility), based on whether the bank group number of the respective command is currently tracked in one of bank group entries 428. In these embodiments, bank group tracking circuit 425 updates the tags in command queue 410 when a bank group number is added or removed from entries 428.

Figure 5:
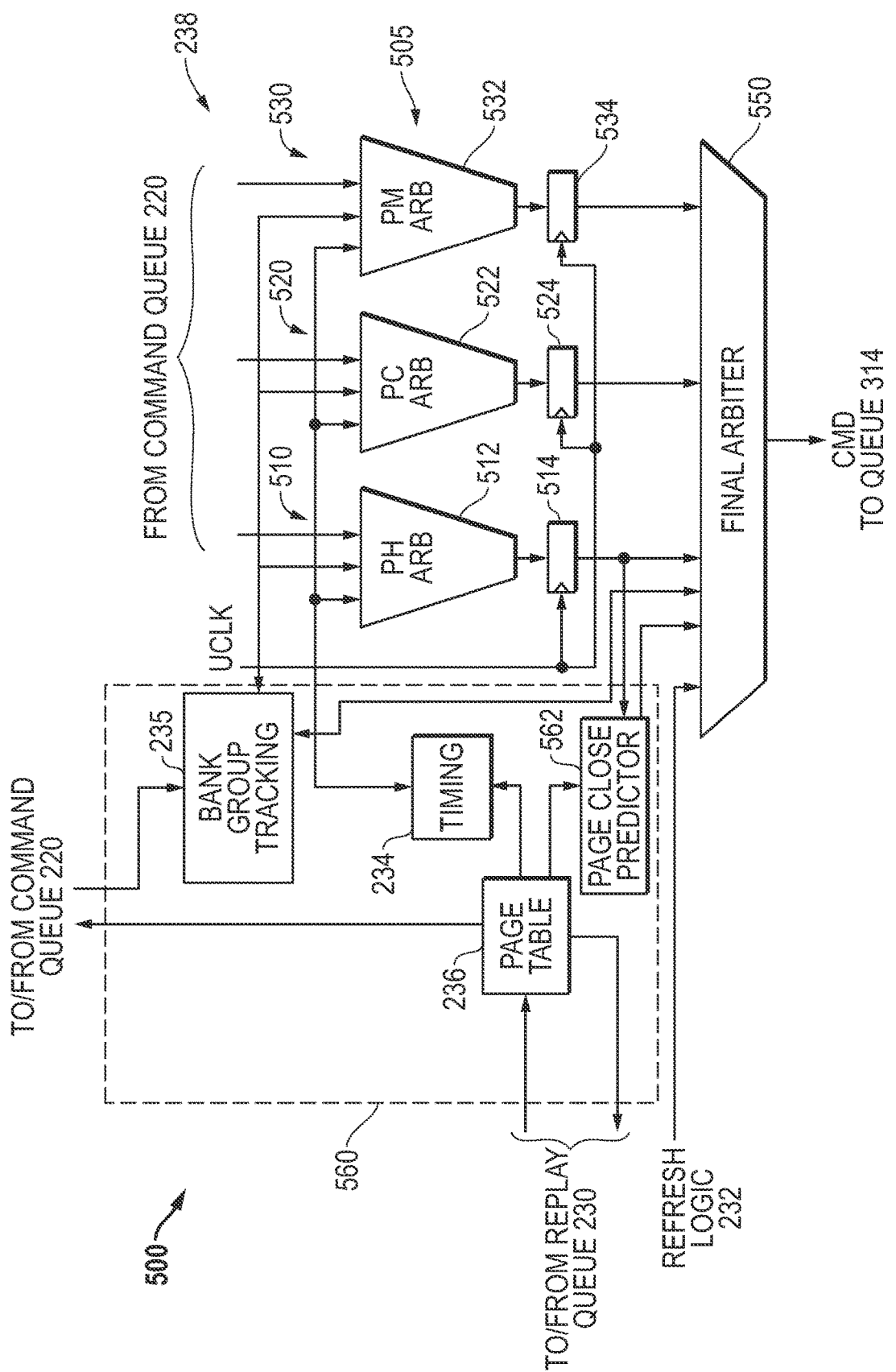
FIG. 5 illustrates in block diagram form a portion of the memory controller of FIG. 2 according to some additional embodiments.

FIG. 5 illustrates a block diagram of a portion 500 of memory controller 200 of FIG. 2 according to some embodiments. The depicted portion 500 is suitable for use in a memory controller for DDR5, GDDR5, and other similar DRAM types with on-die ECC calculations. Portion 500 includes arbiter 238 and a set of control circuits 560 associated with the operation of arbiter 238. Arbiter 238 includes a set of sub-arbiters 505 and a final arbiter 550. Sub-arbiters 505 include a sub-arbiter 510, a sub-arbiter 520, and a sub-arbiter 530. Sub-arbiter 510 includes a page hit arbiter 512 labeled "PH ARB", and an output register 514. Page hit arbiter 512 has a first input connected to command queue 220, a second input connected to bank group tracking circuit 235, a third input connected to timing block 234, and an output. Register 514 has a data input connected to the output of page hit arbiter 512, a clock input for receiving the UCLK signal, and an output. Sub-arbiter 520 includes a page conflict arbiter 522 labeled "PC ARB", and an output register 524. Page conflict arbiter 522 has a first input connected to command queue 220, a second input connected to bank group tracking circuit 235, a third input connected to timing block 234, and an output. Register 524 has a data input connected to the output of page conflict arbiter 522, a clock input for receiving the UCLK signal, and an output.

Sub-arbiter 530 includes a page miss arbiter 532 labeled "PM ARB", and an output register 534. Page miss arbiter 532 has a first input connected to command queue 220, a second input connected to bank group tracking circuit 235, a third input connected to timing block 234, and an output. Register 534 has a data input connected to the output of page miss arbiter 532, a clock input for receiving the UCLK signal, and an output. Final arbiter 550 has a first input connected to the output of refresh control logic 232, a second input from a page close predictor 562, a third input connected to the output of output register 514, a fourth input connected to the output of output register 524, a fifth input connected to the output of output register 534, a first output for providing a first arbitration winner to queue 214 labeled "CMD1", and a second output for providing a second arbitration winner to queue 214 labeled "CMD2".

Control circuits 560 include timing block 234 and page table 236 as previously described with respect to FIG. 2, a page close predictor 562, and bank group tracking circuit 235. Timing block 234 has an input connected to page table 236, and an input and an output connected to page hit arbiter 512, page conflict arbiter 522, and page miss arbiter 532. Page table 236 has an input connected to an output of replay queue 230, an output connected to an input of replay queue 230, an output connected to the input of command queue 220, an output connected to the input of timing block 234, and an output connected to the input of page close predictor 562. Page close predictor 562 has an input connected to one output of page table 236, an input connected to the output of output register 514, and an output connected to the second input of final arbiter 550. Bank group tracking circuit 235 has an input connected to command queue 220, an input and output connected to final arbiter 550, and an input and output connected to page hit arbiter 512, page conflict arbiter 522, and page miss arbiter 532.

Each of page hit arbiter 512, page conflict arbiter 522, and page miss arbiter 532 has an input connected to the output of timing block 234 to determine timing eligibility of commands in command queue 220 that fall into these respective categories. Timing block 234 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, DDR5 and GDDR5 memories require more timers to comply with more timing parameters than other DDRx memory types. By including an array of generic timers implemented as binary counters, timing block 234 can be scaled and reused for different memory types.

A page hit is a read or write cycle to an open page. However, page hit tracking for write commands is also governed in this embodiment by the bank group tracking process. Page hits for write commands are not eligible to be selected if the bank group number for the candidate command is currently tracked by bank group tracking circuit 235, unless no other candidates are available. Page hit arbiter 512 arbitrates between accesses in command queue 220 to open pages. The timing eligibility parameters tracked by timers in timing block 234 and checked by page hit arbiter 512 include, for example, row address strobe (RAS) to column address strobe (CAS) delay time ($t_{RCD}$) and CAS latency ($t_{CL}$). For example, $t_{RCD}$ specifies the minimum amount of time that must elapse before a read access to a page after it has been opened in a RAS cycle. Page hit arbiter 512 selects a sub-arbitration winner based on the assigned priority of the accesses. In one embodiment, the priority is a 4-bit, one-hot value that therefore indicates a priority among four values, however it should be apparent that this four-level priority scheme is just one example. If page hit arbiter 512 detects two or more requests at the same priority level, then the oldest entry wins.

A page conflict is an access to one row in a bank when another row in the bank is currently activated. Page conflict arbiter 522 arbitrates between accesses in command queue 220 to pages that conflict with the page that is currently open in the corresponding bank and rank. Page conflict arbiter 522 selects a sub-arbitration winner that causes the issuance of a precharge command. The timing eligibility parameters tracked by timers in timing block 234 and checked by page conflict arbiter 522 include, for example, active to precharge command period ($t_{RAS}$). Page conflict sub-arbitration for write commands also considers the bank group number for candidate write commands. Candidate write commands are not eligible to be selected if the bank group number for the candidate command is currently tracked by bank group tracking circuit 235, unless no other candidates are available. Page conflict arbiter 522 selects a sub-arbitration winner based on the assigned priority of the access. If page conflict arbiter 522 detects two or more requests at the same priority level, then the oldest entry wins.

A page miss is an access to a bank that is in the precharged state. Page miss arbiter 532 arbitrates between accesses in command queue 220 to precharged memory banks. The timing eligibility parameters tracked by timers in timing block 234 and checked by page miss arbiter 532 include, for example, precharge command period ($t_{RP}$). If there are two or more requests that are page misses at the same priority level, then the oldest entry wins.

Each sub-arbiter outputs a priority value for their respective sub-arbitration winner. Final arbiter 550 compares the priority values of the sub-arbitration winners from each of page hit arbiter 512, page conflict arbiter 522, and page miss arbiter 532. Final arbiter 550 determines the relative priority among the sub-arbitration winners by performing a set of relative priority comparisons taking into account two sub-arbitration winners at a time. The sub-arbiters may include a set of logic for arbitrating commands for each mode, read and write, so that when the current mode changes, a set of available candidate commands are quickly available as sub-arbitration winners.

After determining the relative priority among the three sub-arbitration winners, final arbiter 550 then determines whether the sub-arbitration winners conflict (i.e. whether they are directed to the same bank and rank). When there are no such conflicts, then final arbiter 550 selects up to two sub-arbitration winners with the highest priorities. When there are conflicts, then final arbiter 550 complies with the following rules. When the priority value of the sub-arbitration winner of page hit arbiter 512 is higher than that of page conflict arbiter 522, and they are both to the same bank and rank, then final arbiter 550 selects the access indicated by page hit arbiter 512. When the priority value of the sub-arbitration winner of page conflict arbiter 522 is higher than that of page hit arbiter 512, and they are both to the same bank and rank, final arbiter 550 selects the winner based on several additional factors. In some cases, page close predictor 562 causes the page to close at the end of the access indicated by page hit arbiter 512 by setting the auto precharge attribute.

Within page hit arbiter 512, the priority is initially set by the request priority from the memory accessing agent, but the priority is adjusted dynamically based on the type of accesses (read or write) and the sequence of accesses. In general, page hit arbiter 512 assigns a higher implicit priority to reads, but implements a priority elevation mechanism to ensure that writes make progress toward completion.

Whenever page hit arbiter 512 selects a read or write command, page close predictor 562 determines whether to send the command with the auto-precharge (AP) attribute or not. During a read or write cycle, the auto-precharge attribute is set with a predefined address bit and the auto-precharge attribute causes the DDR device to close the page after the read or write cycle is complete, which avoids the need for the memory controller to later send a separate precharge command for that bank. Page close predictor 562 takes into account other requests already present in command queue 220 that access the same bank as the selected command. If page close predictor 562 converts a memory access into an AP command, the next access to that page will be a page miss.

By using different sub-arbiters for different memory access types, each arbiter can be implemented with simpler logic than if it were required to arbitrate between all access types (page hits, page misses, and page conflicts), although embodiments including a single arbiter are envisioned. Thus the arbitration logic can be simplified and the size of arbiter 238 can be kept relatively small.

In other embodiments, arbiter 238 could include a different number of sub-arbiters. In yet other embodiments, arbiter 238 could include two or more sub-arbiters of a particular type. For example, arbiter 238 could include two or more page hit arbiters, two or more page conflict arbiters, and/or two or more page miss arbiters.

In operation, arbiter 238 selects memory access commands from command queue 220 and refresh control logic 232 by taking into account the bank group numbers tracked by bank group tracking circuit 235, the page status of each entry, the priority of each memory access request, and the dependencies between requests. The priority is related to the quality of service or QoS of requests received from the AXI4 bus and stored in command queue 220, but can be altered based on the type of memory access and the dynamic operation of arbiter 238. Arbiter 238 includes three sub-arbiters that operate in parallel to address the mismatch between the processing and transmission limits of existing integrated circuit technology. The winners of the respective sub-arbitrations are presented to final arbiter 550. In some embodiments, each winner is tagged to indicate whether it has a currently tracked bank number but was nevertheless selected because no other suitable write commands were available. Final arbiter 550 selects between these three sub-arbitration winners as well as a refresh operation from refresh control logic 232, and may further modify a read or write command into a read or write with auto-precharge command as determined by page close predictor 562.

Based on the tracked bank group numbers in entries 428 of bank group tracking circuit 235, arbiter 238 prevents selection of write requests and associated activate commands to the tracked bank group numbers unless no other write request is eligible in the command queue. If a request is passed over (not selected) because its bank group number is tracked, it becomes eligible after the tracking period expires. Bank group tracking circuit 235 indicates that a prior write request is eligible to be issued after a number of clock cycles has passed corresponding to a minimum writeto-write timing period for the bank group of the prior write request by removing the restricted bank group number from its tracking entries.

Figure 6:
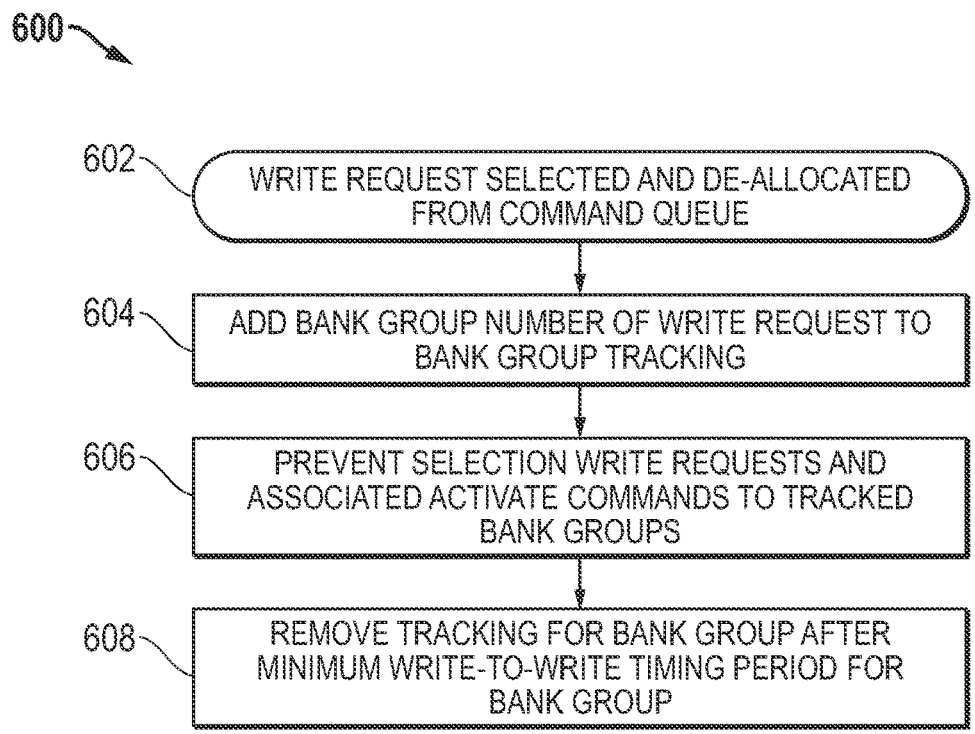
FIG. 6 shows a flow diagram of a process for handling a write command according to some embodiments.

FIG. 6 shows a flow diagram 600 of a process for operating a bank group tracking circuit to track a write command according to some embodiments. The process is suitable to be performed by bank group tracking circuit 425 (FIG. 4), bank group tracking circuit 235 (FIG. 5), or another suitable digital logic circuit connected to an arbiter. The process beings at block 602 when an arbiter selects a write requests from the command queue for transmission to the DRAM memory. An associated activate command (ACT) for the selected write command is dispatched before the write command to activate the row for write command. Intervening commands may be dispatched between the associated ACT and the selected write command. The selected write command is de-allocated from the command queue and sent to a memory interface queue or memory PHY for transmission to the DRAM memory. The bank group tracking circuit monitors the dispatched write commands, or is notified by the arbiter or memory interface queue that the write command is dispatched. In response to such notification, at block 604 the bank group tracking circuit adds the bank group number of the dispatched write command to its bank group tracking entries. At block 604, a timer may be started or an entry made with a timer tracking circuit to count the clock cycles elapsed after the write command was dispatched.

For the tracked bank group numbers, the process at block 606 includes preventing selection of a subsequent write request and its associated activate command to the tracked bank group numbers unless no other write request is eligible in the command queue. Typically the selection process, conducted at an arbiter circuit, cycles through non-tracked bank group numbers and checks whether a write request for each respective bank group is eligible for selection until finding an eligible write request. At block 608, the process removes the tracking for a bank group number after a number of clock cycles has passed corresponding to a minimum write-to-write timing period for the bank group of the prior write request. If any prior write requests have been passed over for selection for the particular bank group, this block makes such a prior write request eligible to be issued after the minimum write-to-write timing period for the bank group has passed since a prior write request was issued to the bank group.

Generally the process includes tracking bank group numbers for up to three or more prior write requests selected by the arbiter. The number of tracked bank group numbers varies depending on the length of the minimum write-to-write timing period for a bank group, which is typically governed by the speed of a DRAM chip in calculating on-die ECC codes and writing them to DRAM along with the relevant write data.

Figure 7:
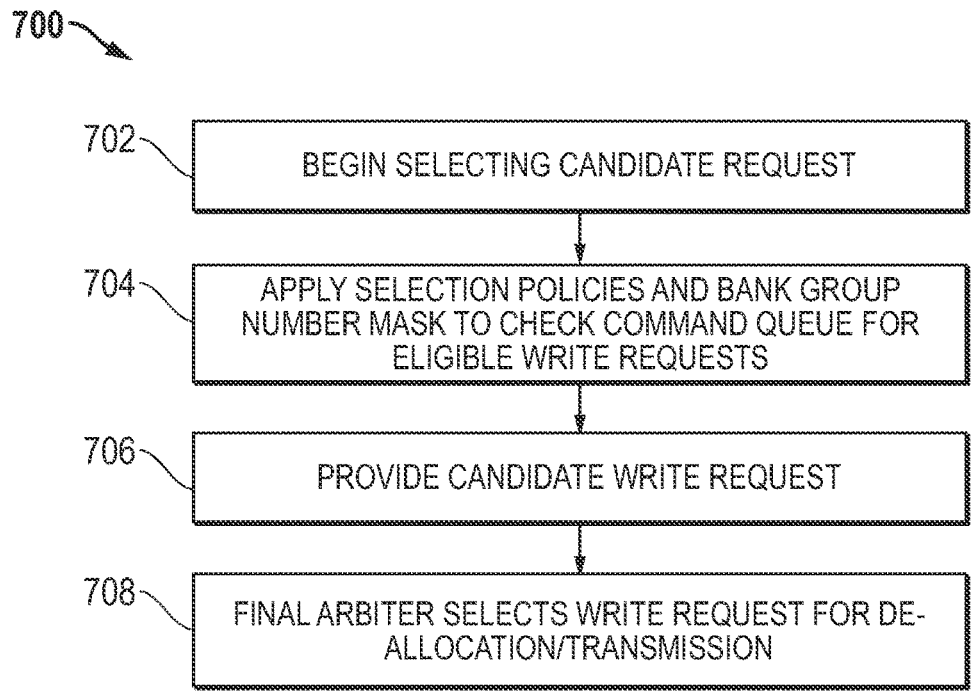
FIG. 7 shows a flow diagram of a process for arbitrating commands according to some embodiments.

FIG. 7 shows a flow diagram 700 of a process for arbitrating commands according to some embodiments. The depicted process is suitable for implementing with an arbiter and bank group tracking circuit such as those of FIG. 5. At block 702, the process is conducted for a sub-arbiter which is selecting a candidate request.

At block 704, the process applies the sub-arbiter selection policies in selecting a candidate request, and also applies a bank group number mask for the tracked bank group numbers when checking the command queue for eligible write requests. As discussed above, the write commands to the bank groups that are tracked are not eligible, or are "masked", unless no other write commands are eligible for selection.

At block 706, the process provides candidate write requests from each sub-arbiter. Multiple sub-arbiters of an arbiter typically perform the process, and each will provide a candidate request as discussed with respect to the sub-arbiters of FIG. 5. At block 708, the final arbiter selects a write request for de-allocation from the command queue and transmission to DRAM memory. Because the bank group number mask is applied at the sub arbiters, the final arbiter does not need to consider the bank group tracking process.

Memory controller 200 of FIG. 2 or any portions thereof, such as arbiter 238 and refresh control logic 232, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 210 and/or power engine 250 may vary in different embodiments. Memory controller 200 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A method, comprising:
   receiving a plurality of memory access requests at a memory controller and placing the plurality of memory access requests in a command queue to await transmission to a dynamic random access memory (DRAM) including multiple bank groups;
   with an arbiter, selecting write requests from among the plurality of memory access requests in the command queue for transmission to the DRAM;
   tracking bank group numbers for three or more prior write requests selected by the arbiter from among the plurality of memory access requests;
   preventing selection of a subsequent write request and an associated activate command to a respective bank group of the tracked bank group numbers; and making a write request that has been passed over for selection for one of the tracked bank groups and an associated activate command among the associated activate commands eligible to be issued after a designated period has elapsed.

2. The method of claim 1, further comprising, when selecting a new write request, cycling through non-tracked bank group numbers and checking whether a write request for each respective bank group is eligible for selection until finding an eligible write request.

3. The method of claim 1, further comprising counting a number of clock cycles for which each bank group number of the bank group numbers has been tracked with at least one timer.

4. The method of claim 1, further comprising selecting memory access requests from the plurality of memory access requests in the command queue based on the tracked bank group numbers and a set of policies including a timing eligibility, an age, a fairness, and an activity type.

5. The method of claim 1, further comprising selectively picking candidate memory requests from among the plurality of memory access requests in the command queue according to a first type of access, a second type of access, and information provided from a bank group tracking circuit, wherein each type of access corresponds to a different page status of a bank in the memory, and then arbitrating a request selection from the candidate memory requests.

6. The method of claim 1, wherein the designated period is a number of clock cycles corresponding to a minimum write-to-write timing period for the bank group of the prior write request.

7. A memory controller, comprising:
a command queue circuit having an input for receiving memory access requests for a memory channel, and a number of entries for holding a predetermined number of the memory access requests; and
an arbiter circuit for selecting the memory access requests from the command queue for transmission to a dynamic random access memory (DRAM) coupled to a DRAM channel, the arbiter comprising:
a bank group tracking circuit that tracks bank group numbers of three or more prior write requests selected by the arbiter circuit from among the memory access requests; and
a selection circuit that selects requests to be issued from among the memory access requests in the command queue circuit, and prevents selection of write requests and associated activate commands to the tracked bank group numbers,
wherein the bank group tracking circuit indicates that a write request that has been passed over for selection for one of the tracked bank groups and an associated activate command among the associated activate commands are eligible to be issued after a designated period has elapsed.

8. The memory controller of claim 7, wherein the selection circuit, when selecting a new write request, cycles through non-tracked bank group numbers and checks whether a write request for each respective bank group is eligible for selection until finding an eligible write request.

9. The memory controller of claim 7, wherein the bank group tracking circuit includes at least one timer circuit for counting a number of clock cycles for which each bank group number of the bank group numbers has been tracked.

10. The memory controller of claim 7, wherein the bank group tracking circuit comprises a plurality of entries each holding a bank group number, and a plurality of timers each associated with a respective one of the plurality of entries of the bank group tracking circuit and counting a number of clock cycles for which a respective bank group number among the bank group numbers has been tracked.

11. The memory controller of claim 7, wherein the selection circuit includes a number of inputs each receiving a tracked bank group number, the selection circuit selecting memory access requests from among the memory access requests in the command queue circuit based on the tracked bank group numbers and a set of policies including a timing eligibility, an age, a fairness, and an activity type.

12. The memory controller of claim 7, wherein the selection circuit comprises:
at least one sub-arbiter circuit for selectively picking candidate memory requests from the command queue circuit according to a first type of access and a second type of access, wherein each type of access corresponds to a different page status of a bank in the memory, the at least one sub-arbiter circuit selecting write requests based on information provided from the bank group tracking circuit; and
a final arbiter circuit that arbitrates a request selection from the candidate memory requests.

13. The memory controller of claim 7, wherein the designated period is a number of clock cycles corresponding to a minimum write-to-write timing period for a bank group number among the bank group numbers of a prior write request among the three or more prior write requests.

14. A data processing system, comprising:
a memory channel coupled to a dynamic random access memory (DRAM); and
a memory controller coupled to the memory channel, comprising:
a command queue circuit having an input for receiving memory access requests for the memory channel, and a number of entries for holding a predetermined number of the memory access requests;
an arbiter circuit for selecting memory access requests to be issued from among the memory access requests in the command queue circuit for transmission to the DRAM, the arbiter comprising:
a bank group tracking circuit that tracks bank group numbers of three or more prior write requests selected by the arbiter circuit from among the memory access requests; and
a selection circuit that prevents selection of write requests from among the memory access requests in the command queue circuit and associated activate commands to the tracked bank group numbers,
wherein the bank group tracking circuit indicates that a write request that has been passed over for selection for one of the tracked bank groups and an associated activate command among the associated activate commands are eligible to be issued after a designated period has elapsed.

15. The data processing system of claim 14, wherein the selection circuit, when selecting a new write request, cycles through non-tracked bank group numbers and checks whether a write request for each respective bank group is eligible for selection until finding an eligible write request.

16. The data processing system of claim 14, wherein the bank group tracking circuit includes at least one timer circuit for counting a number of clock cycles for which each bank group number of the bank group numbers has been tracked.

17. The data processing system of claim 14, wherein the bank group tracking circuit comprises a plurality of entries each holding a bank group number, and a plurality of timers each associated with a respective one of the plurality of entries of the bank group tracking circuit and counting a number of clock cycles for which a respective bank group number among the bank group numbers has been tracked.

18. The data processing system of claim 14, wherein the selection circuit includes a number of inputs each receiving a tracked bank group number, the selection circuit selecting memory access requests from among the memory access requests in the command queue circuit based on the tracked bank group numbers and a set of policies including a timing eligibility, an age, a fairness, and an activity type.

19. The data processing system of claim 14, wherein the selection circuit comprises:
  at least one sub-arbiter circuit that selectively picks candidate memory access requests from the command queue circuit according to a first type of access and a second type of access, wherein each type of access corresponds to a different page status of a bank in the memory, the at least one sub-arbiter circuit selecting write requests based on information provided from the bank group tracking circuit; and
  a final arbiter circuit that arbitrates a request selection from the candidate memory access requests.

20. The data processing system of claim 14, wherein the designated period is a number of clock cycles corresponding to a minimum write-to-write timing period for a bank group number among the bank group numbers of a prior write request among the three or more prior write requests.

* * * * *